US008217929B2

(12) United States Patent
Tokumura

(10) Patent No.: US 8,217,929 B2
(45) Date of Patent: Jul. 10, 2012

(54) ELECTRO-OPTICAL DEVICE, DRIVING METHOD, AND ELECTRONIC APPARATUS WITH USER ADJUSTABLE RATIO BETWEEN POSITIVE AND NEGATIVE FIELD

(75) Inventor: Toshiaki Tokumura, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 890 days.

(21) Appl. No.: 11/953,528

(22) Filed: Dec. 10, 2007

(65) Prior Publication Data

US 2008/0186296 A1 Aug. 7, 2008

(30) Foreign Application Priority Data

Feb. 7, 2007 (JP) ................................ 2007-028062

(51) Int. Cl.
*G06F 3/038* (2006.01)
*G09G 3/36* (2006.01)
*G09G 5/00* (2006.01)

(52) U.S. Cl. ............ 345/213; 345/96; 345/99; 345/209

(58) Field of Classification Search ............ 345/87–103, 345/204, 209, 213, 694; 348/513, 543
See application file for complete search history.

(56) References Cited

U.S. PATENT DOCUMENTS 6,469,684 B1 10/2002 Cole
6,674,421 B2 * 1/2004 Mori et al. ...................... 345/96
7,221,344 B2 * 5/2007 Shimomaki ..................... 345/87
2004/0095307 A1 5/2004 Kim
2005/0104835 A1 * 5/2005 Misonou et al. ................ 345/96
2005/0184944 A1 * 8/2005 Miyata et al. .................. 345/89
2006/0256069 A1 * 11/2006 Okazaki ........................ 345/102

FOREIGN PATENT DOCUMENTS

JP A-08-500915 1/1996
JP A-08-171370 7/1996
JP A-2005-225169 8/2005
WO WO 95/01701 A1 1/1995

* cited by examiner

*Primary Examiner* — Bipin Shalwala
*Assistant Examiner* — Keith Crawley
(74) *Attorney, Agent, or Firm* — Oliff & Berridge, PLC

(57) ABSTRACT

A method of driving the electro-optical device includes selecting a plurality of scanning lines in a predetermined order in each of first and second fields of one frame; when one of the plurality of scanning lines is selected in the first field, for each pixel located on the selected scanning line, supplying one of a positive voltage and a negative voltage as the data signal to one of the plurality of data lines associated with the pixel, the positive voltage having a positive polarity corresponding to a voltage higher than a predetermined reference potential and the negative polarity corresponding to a voltage lower than the predetermined reference potential; and when the one of the plurality of scanning lines is selected in the second field, for each pixel located on the selected scanning line, supplying the other one of the positive voltage and the negative voltage as the data signal to one of the plurality of data lines associated with the pixel. A ratio between durations of the first field and the second field of the one frame is adjustable.

13 Claims, 12 Drawing Sheets

<VERTICAL SCANNING>

<HORIZONTAL SCANNING (SECOND FIELD)>

ELECTRO-OPTICAL DEVICE, DRIVING METHOD, AND ELECTRONIC APPARATUS WITH USER ADJUSTABLE RATIO BETWEEN POSITIVE AND NEGATIVE FIELD

BACKGROUND

1. Technical Field

The present invention relates to techniques for preventing burn-in of electro-optical devices.

2. Related Art

Generally, in electro-optical devices, such as liquid crystal displays, in order to prevent application of a DC component to a liquid crystal capacitor (pixel) formed by holding liquid crystal between a pixel electrode and a counter electrode, basically, AC driving is employed, i.e., the voltage applied to the pixel electrode is alternated between a higher (positive-polarity) voltage and a lower (negative-polarity) voltage.

Furthermore, in the case of active-matrix driving, in which pixel electrodes are driven by thin-film transistors (hereinafter referred to as "TFTs"), pushdown (also referred to as field through) or the like occurs.

Thus, if the reference voltage for defining the voltage applied to the pixel electrode is chosen to be the same as the voltage applied to the counter electrode, the effective value of voltage stored in the liquid crystal capacitor differs between cases of positive-polarity and negative-polarity voltages even if the positive-polarity and negative-polarity voltages correspond to the same pixel level. This causes application of a DC component to the liquid crystal capacitor.

If a DC component is applied to the liquid crystal capacitor, the liquid crystal could be degraded so that a still picture displayed previously appears as an afterimage. Since this afterimage is similar to burn-in that occurs on the fluorescent surface of a cathode-ray-tube (CRT) display, the phenomenon caused by application of a DC component to the liquid crystal capacitor is sometimes called burn-in Furthermore, the difference in the effective value of voltage at the liquid crystal capacitor causes a difference in the pixel level brightness) of the pixel, and this might cause flicker in an image displayed.

In order to overcome this problem, techniques have been proposed in which the voltage of the counter electrode is adjusted so that flicker will be minimized when positive-polarity and negative-polarity voltages corresponding to the same pixel level are applied alternately (e.g., see JP-A-2005-225169).

However, in some cases, is not possible to prevent application of a DC component to the liquid crystal capacitor simply by adjusting the voltage of the counter electrode. Furthermore, it is not possible to prevent application of a DC component flexibly.

SUMMARY

An advantage of some aspects of the invention is that application of a DC component to a liquid crystal capacitor can be prevented in a way other than adjusting the voltage of a counter electrode.

According to an aspect of the invention, there is provided a method of driving an electro-optical device including a plurality of pixels provided in association with intersections of a plurality of scanning lines and a plurality of data lines, each of the plurality of pixels having a pixel level corresponding to a voltage of a data signal supplied to one of the plurality of data lines associated with the pixel when one of the plurality of scanning lines associated with the pixel is selected. The method includes selecting the plurality of scanning lines in a predetermined order in each of first and second fields of one frame; when one of the plurality of scanning lines is selected in the first field, for each pixel located on the selected scanning line, supplying a voltage as the data signal to one of the plurality of data lines associated with the pixel, the voltage corresponding to a pixel level of the pixel and having one of a positive polarity and a negative polarity, the positive polarity corresponding to a voltage higher than a predetermined reference potential and the negative polarity corresponding to a voltage lower than the predetermined reference potential; and when the one of the plurality of scanning lines is selected in the second field, for each pixel located on the selected scanning line, supplying a voltage as the data signal to one of the plurality of data lines associated with the pixel, the voltage corresponding to a pixel level of the pixel and having the other one of the positive polarity and the negative polarity. A ratio between durations of the first field and the second field of the one frame is adjustable. The durations of the first field and the second field of the one frame can be different. According to this aspect, by adjusting the ratio between durations of the first field and the second field of one frame the period of maintaining a positive-polarity voltage and the period of maintaining a negative-polarity voltage at a pixel change.

Preferably, during the first and second fields of one frame, the plurality of scanning lines are selected sequentially in a predetermined direction at predetermined intervals, starting from a predetermined one of the plurality of scanning lines, and the data signal supplied to the associated data line has one of the positive polarity and the negative polarity, and during the second field of the one frame and the first field of a next frame, the plurality of scanning lines are selected sequentially in the predetermined direction at the predetermined intervals, starting from the predetermined one of the plurality of scanning lines, and the data signal supplied to the associated data line has the other one of the positive polarity and the negative polarity.

The present invention can be considered as relating to an electro-optical device or as an electronic apparatus including the electro-optical device as well as relating to a method of driving an electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
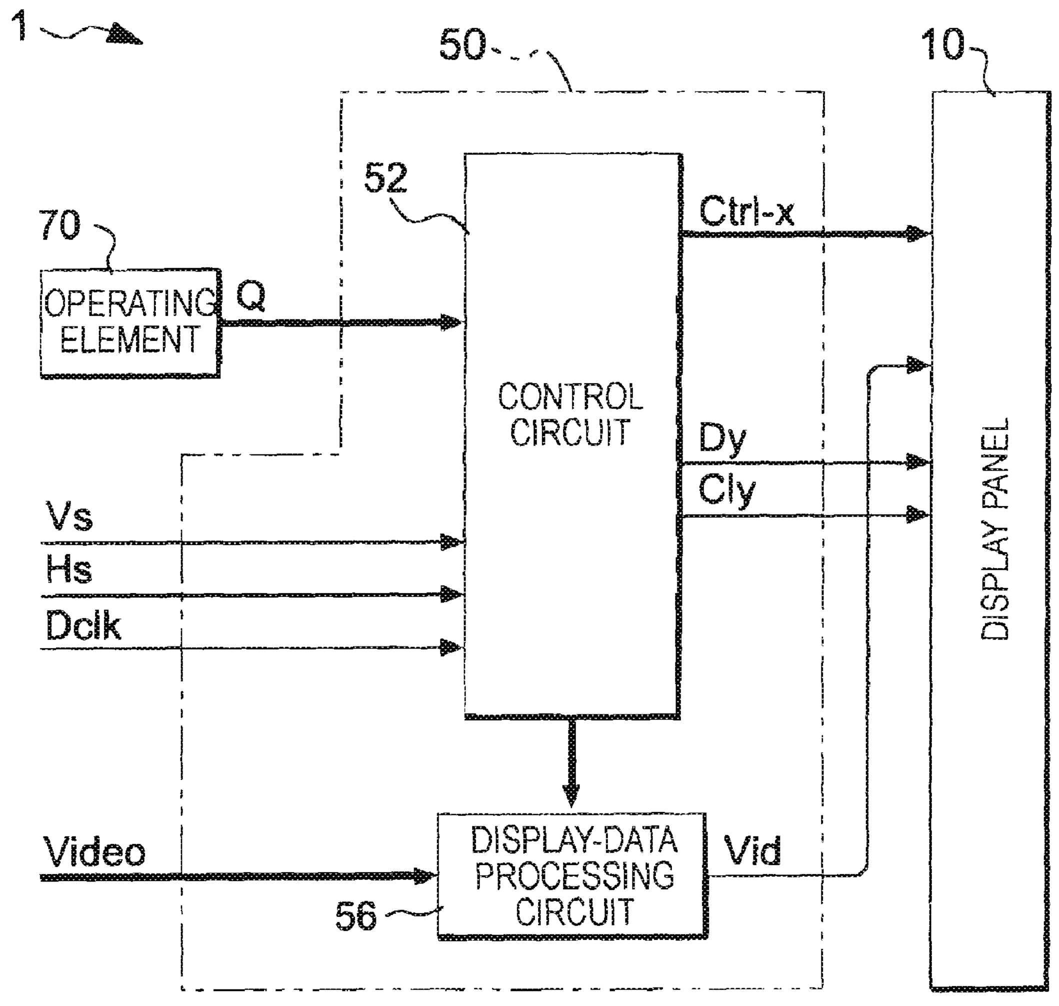
FIG. 1 is a block diagram showing the configuration of an electro-optical device according to an embodiment of the invention.

Now, an embodiment of the invention will be described with reference to the drawings. FIG. 1 is a block diagram showing the configuration of an electro-optical device according to an embodiment of the invention.

As shown in FIG. 1, an electro-optical device 1 generally includes a display panel 10, a processing circuit 50, and an operating element 70. The processing circuit 50 includes a control circuit 52 and a display-data processing circuit 56. The processing circuit 50 is a circuit module that controls the operation of the display panel 10 and so forth according to output of data signals Vid, and is connected to the display panel 10; for example, via a flexible printed circuit (FPC) board.

The control circuit 52 generates various control signals for controlling the display panel 10 in synchronization with a vertical synchronization signal Vs, a horizontal synchronization signal Hs, and a dot clock signal Dclk supplied from an external upper-level device (not shown). These control signals will be described later as needed. In addition to generating various control signals, the control circuit 52 also controls the display-data processing circuit 56.

The operating element 70 is operated, for example, by a user, and outputs a specification value Q corresponding to the operation, for example, in a range of "+10" to "−10". As will be described later, the timing of output of a start pulse Dyb becomes earlier or later according to the specification value Q.

Under the control of the control circuit 52, the display-data processing circuit 56 temporarily stores display data Video supplied from the external upper-level device in an internal memory (not shown), then reads the display data Video in synchronization with driving of the display panel 10, and converts the display data Video into analog data signals Vid. The display data Video is data for specifying pixel levels of pixels of the display panel 10. Although the waveform is not shown specifically, display data Video for one frame is supplied triggered by the timing of supply of the vertical synchronization signal Vs, and display data Video for one row is supplied triggered by the timing of supply of the horizontal synchronization signal Hs. In this embodiment, the vertical synchronization signal Vs has a frequency of 60 Hz a period of 16.7 milliseconds. The dot clock Dclk defines a period of supply of display data Video for one pixel.

The control circuit 52 controls components of the electro-optical device 1 in synchronization with the supply of the display data Video.

Figure 2:
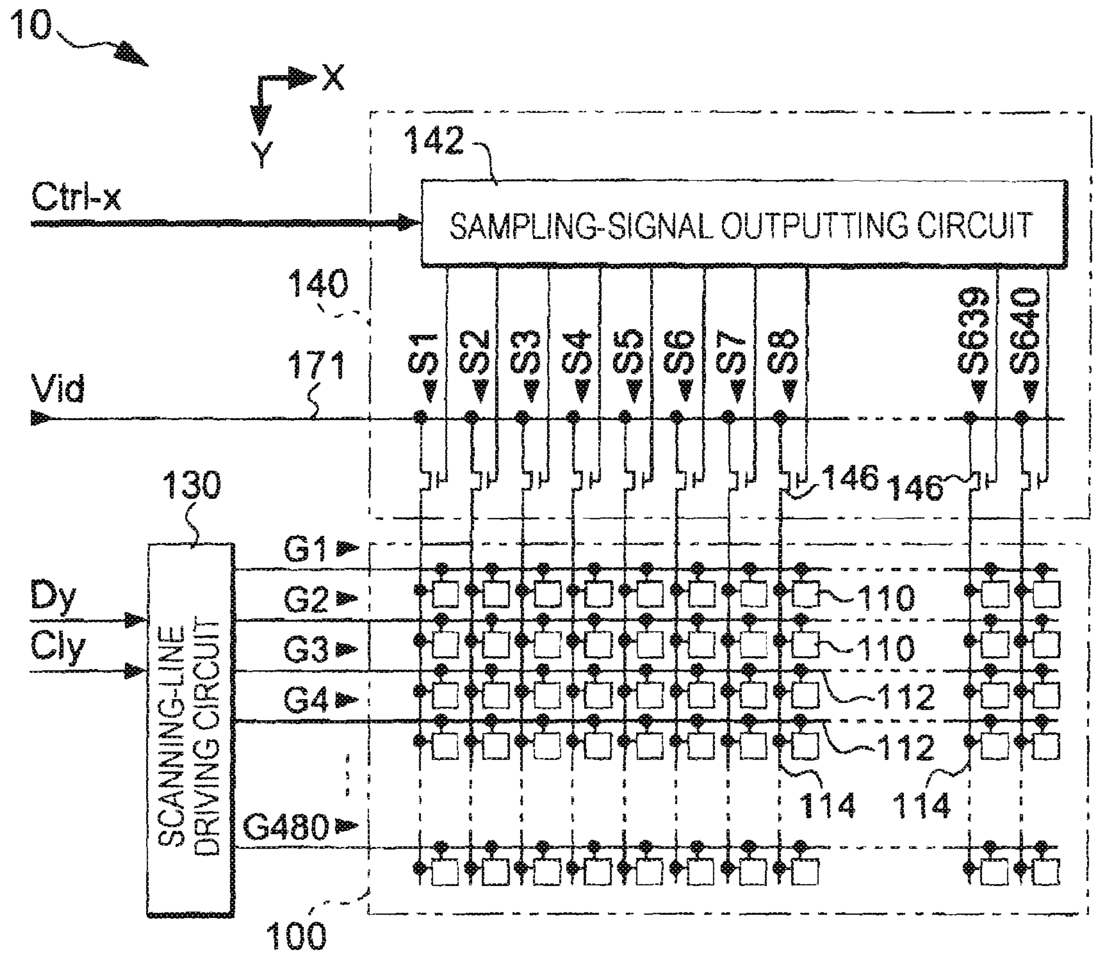
FIG. 2 is a diagram showing the configuration of a display panel in the electro-optical device.

Next, the display panel 10 will be described. FIG. 2 is a diagram showing the configuration of the display panel 10.

As showing in FIG. 2, the display panel 10 includes peripheral circuits integrated therein. More specifically, the display panel 10 includes a scanning-line driving circuit 130 and a data-line driving circuit 140 in peripheral regions of a display area 100. In the display area 100, 480 scanning lines 112 are provided so as to extend in a row (X) direction, and 640 data lines 114 are provided so as to extend in a column (Y) direction. The scanning lines 112 and the data lines 114 are electrically insulated from each other. Furthermore, pixels 110 are arranged individually in association with the intersections of the 480 scanning lines 112 and the 640 data lines 114. Thus, in this embodiment, the pixels 110 are arranged to form a matrix defined by 480 rows and 640 columns. However, the invention is not limited to this arrangement.

Figure 3:
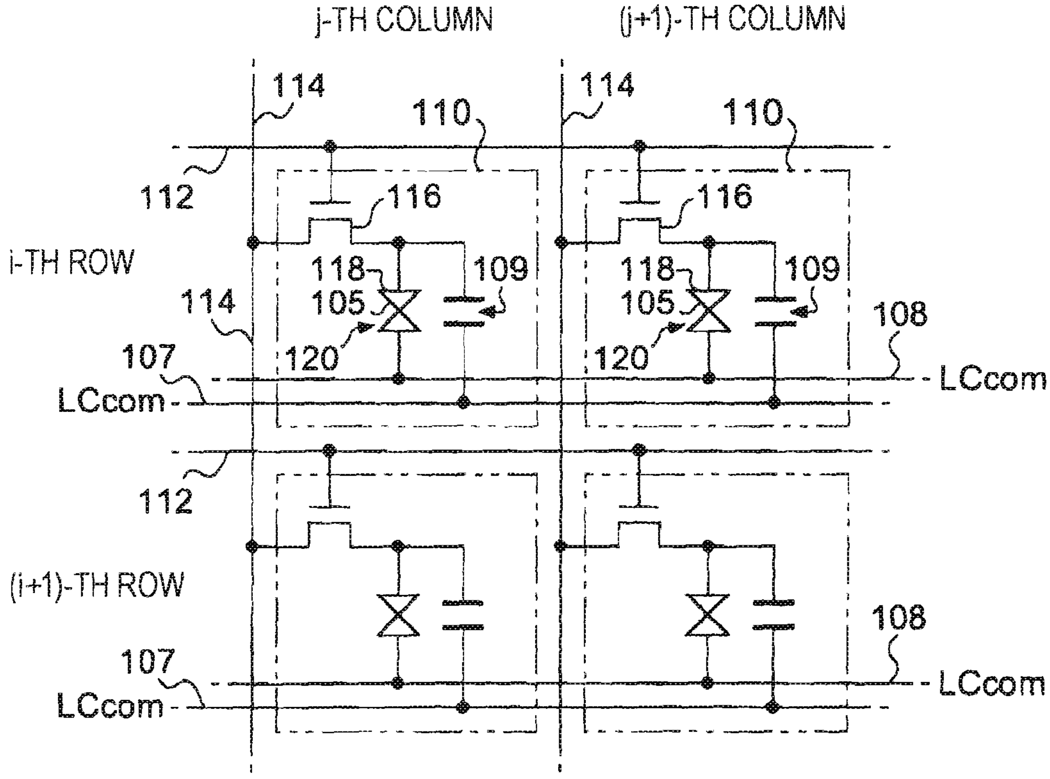
FIG. 3 is a diagram showing the configuration of pixels in the display panel.

Now, the configuration of the pixels 110 will be described with reference to FIG. 3. FIG. 3 shows the configuration of four pixels, more specifically, 2×2 pixels associated with the intersections of the i-th row and the (i+1)-th row adjacent to and below the i-th row and a j-th column and a (j+1)-th column adjacent to and on the right side of the j-th column. i and (i+1) generally denote rows of the pixels 110, and herein take on integer values in a range of 1 to 480. Similarly, j and (j+1) generally denote columns of the pixels 110, and herein take on integer values in a range of 1 to 640.

As shown in FIG. 3, each of the pixels 110 includes an n-channel TFT 116 and a liquid crystal capacitor 120.

Since all the pixels 110 have the same configuration, description will be given in the context of the pixel 110 on the i-th row and j-th column as a representative. At the pixel 110 on the i-th row and j-th column, the gate electrode of the TFT 116 is connected to the i-th scanning line 112, the source electrode of the TFT 116 is connected to the j-th data line 114, and the drain electrode of the TFT 116 is connected to a pixel electrode 118, which serves as one of the terminals of the liquid crystal capacitor 120. The other terminal of the liquid crystal capacitor 120 is connected to a counter electrode 108. The counter electrode 108 is provided commonly for all the pixels 110, and a time constant voltage LCcom is applied to the counter electrode 108.

Although not specifically shown, the display panel 10 is formed of a pair of element substrate and counter substrate bonded together via a constant gap with liquid crystal encapsulated in the gap between the pair of substrates. On the element substrate, the scanning lines 112 the data lines 114, the TFTs 116, and the pixel electrodes 118 are formed together with the scanning-line driving circuit 130 and the data-line driving circuit 140. On the counter substrate, the counter electrode 108 is formed. The element substrate and the counter substrate are bonded together via a constant gap, with the surfaces having these electrodes formed thereon opposing each other. Thus, in this embodiment, the liquid crystal capacitors 120 are formed by the pixel electrodes 118 and the counter electrode 108 holding liquid crystal 105 therebetween.

In this embodiment, the electro-optical device 1 operates in the normally white mode. That is, when the effective values of voltages maintained by the liquid crystal capacitors 120 are approximately zero, the transmission factor of light that transmits through the liquid crystal capacitors 120 becomes maximum, so that a white color is displayed. On the other hand, as the effective values of the voltages increase the amount of light that transmits through the liquid crystal capacitors 120 decreases, and the transmission factor ultimately becomes minimum, so that a black color is displayed.

In this configuration, when a selection voltage is applied to the scanning line 112 to turn on the TFT 116 and a data signal having a voltage corresponding to a pixel level (brightness) is supplied to the pixel electrode 118 via the data line 114 and the TFT 116 that has been turned on, a voltage having an effective value corresponding to the pixel level is maintained by the liquid crystal capacitor 120 at the intersection of the scanning line 112 to which the selection voltage has been applied and the data line 114 through which the data signal has been supplied.

When the scanning line 112 is pulled to a non-selection voltage level, the TFT 116 is turned off. Since the OFF resistance does to actually reach the ideal value of infinity, a certain amount of charges stored in the liquid crystal capacitor 120 leaks. In order to minimize the effect of the OFF leakage, a storage capacitor 109 is provided for each of the pixels. One terminal of the storage capacitor 109 is connected to the pixel electrode 118 (the drain of the TFT 116), and the other terminal of the storage capacitor 109 of each of the pixels is commonly connected to a capacitor line 107. The capacitor line 107 is maintained at a time-constant potential, e.g., a potential corresponding to the voltage LCcom of the counter electrode 108.

The scanning-line driving circuit 130 supplies scanning signals G1, G2, G3, . . . and G480 to the scanning lines on the 1st, 2nd, 3rd, . . . and 480th rows, respectively. The scanning-line driving circuit 130 sets the scanning signal supplied to the selected scanning line to an H level corresponding to a voltage Gdd, and sets the scanning signals supplied to the other scanning lines to an L level corresponding to the non-selection voltage (a ground potential Gnd).

Figure 4:
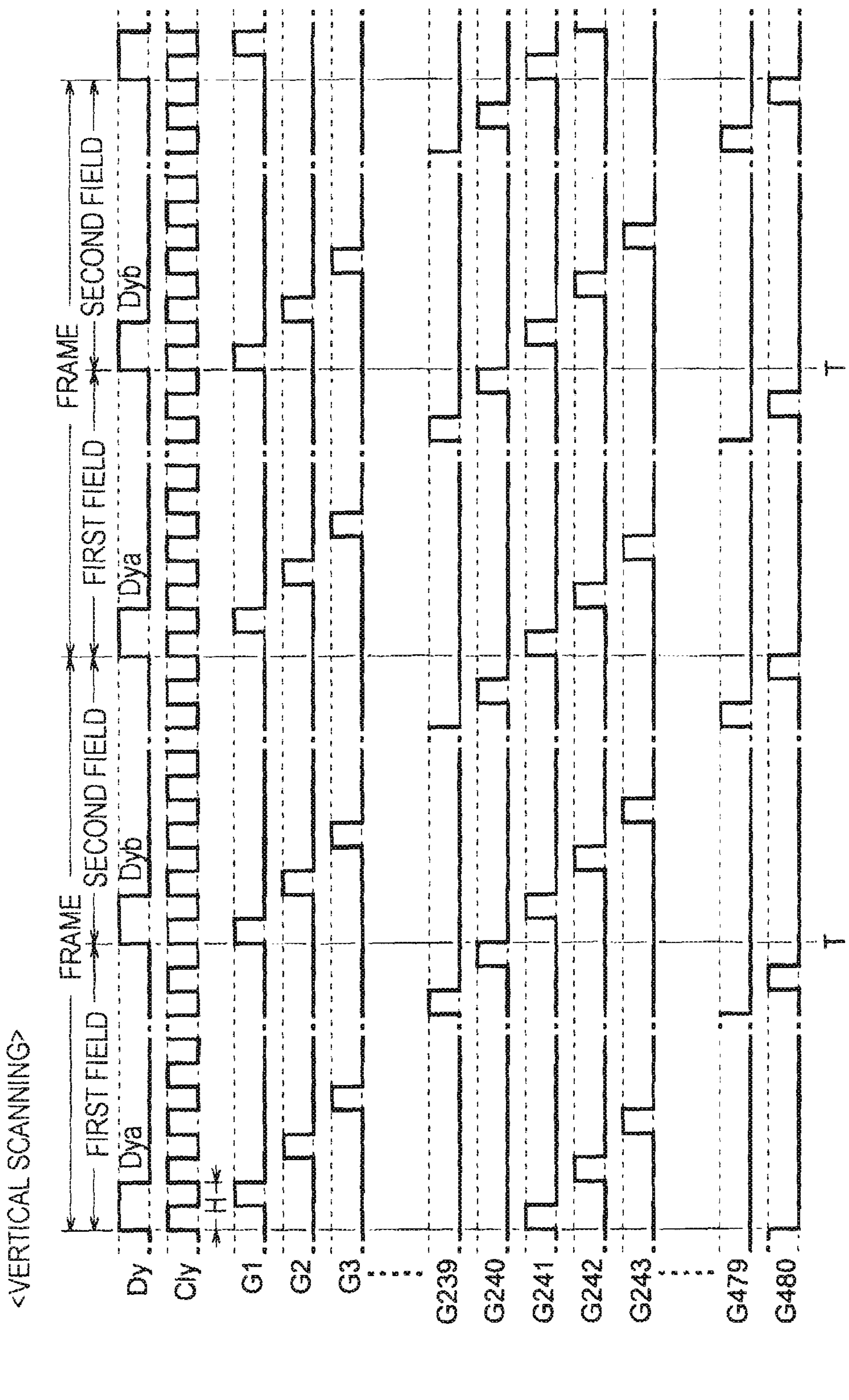
FIG. 4 is a diagram showing an operation of a scanning-line driving circuit in the display panel.

FIG. 4 is a timing chart showing the scanning signals G1 to G480 output from the scanning-line driving circuit 130, in relation to start pulses Dya and Dyb and a clock signal Cly.

As shown in FIG. 4, in the period of one frame, each of the scanning lines 112 is selected twice. The frame herein refers to a period needed to display one image on the display panel 10. In this embodiment, the vertical synchronization signal Vs has a frequency of 60 Hz as described earlier, so that the period of one frame is fixed to 16.7 milliseconds. The control circuit 52 outputs a clock signal Cly having a duty ratio of 50% for 480 periods in one frame, corresponding to the number of scanning lines. The period corresponding to one period of the clock signal Cly is denoted as H.

Furthermore, the control circuit 52 outputs start pulses Dya and Dyb, each having a pulse width corresponding to one period of the clock signal Cly, at timings when the clock signal Cly rises to the H level. More specifically, the control circuit 52 outputs the start pulse Dya at the beginning of the period of one frame (i.e., at the beginning of a first field). Furthermore, if the specification value Q specified by the operating element 70 is "0", the control circuit 52 outputs the start pulse Dyb at a timing T upon outputting the clock signal Cly for 240 periods since the output of the start pulse Dya (i.e., upon elapse of half the period of one frame). If the specification value Q is a negative value, the control circuit 52 outputs the start pulse Dyb at a timing earlier than the timing T by period or periods of the clock signal Cly corresponding to the absolute value of the specification value Q. If the specification value Q is a positive value, the control circuit 52 outputs the start pulse Dyb at a timing later than the timing T by period or periods of the clock signal Cly corresponding to the absolute value of the specification value Q.

Figure 5:
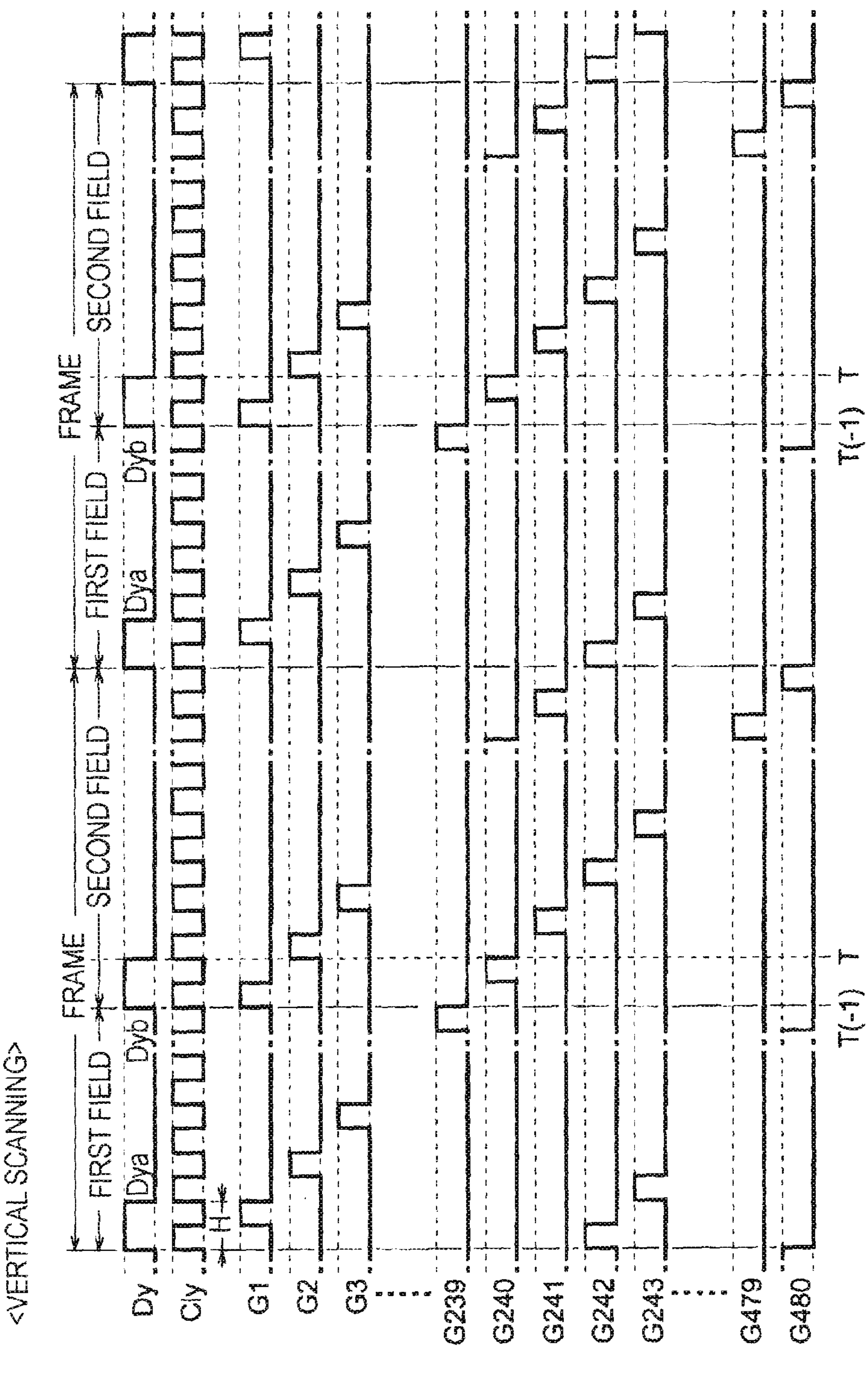
FIG. 5 is a diagram showing an operation of the scanning-line driving circuit in the display panel.
Figure 6:
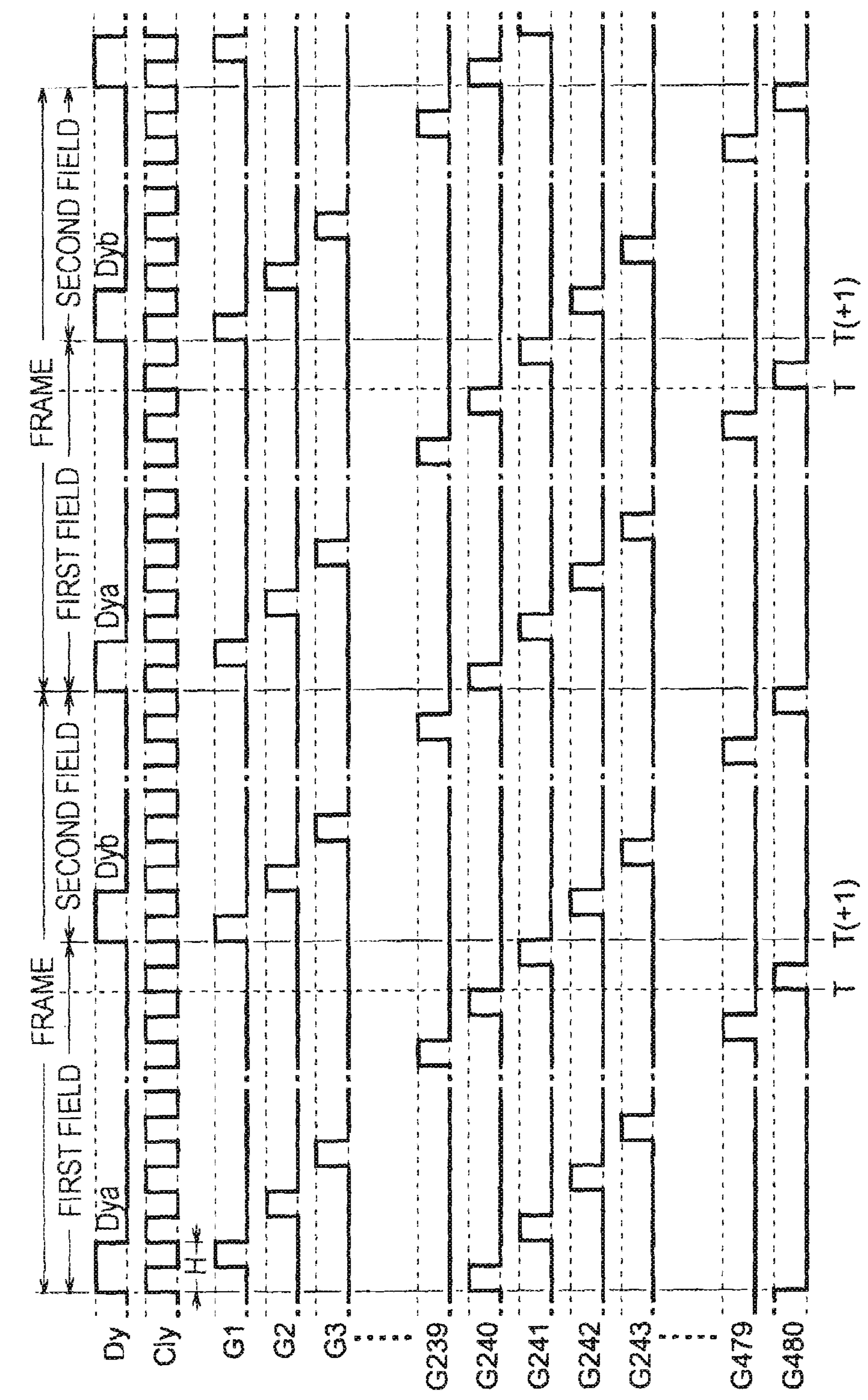
FIG. 6 is a diagram showing an operation of the scanning-line driving circuit in the display panel.

Thus, for example, if the specification value Q is "−1", the start pulse Dyb is output at a timing T(−1) earlier than the timing T by one period of the clock signal Cly, as shown in FIG. 5, and if the specification value Q is "+1", the start pulse Dyb is output at a timing T(+1) later than the timing T by one period of the clock signal Cly, as shown in FIG. 6.

Of the period of one frame, the period from the output of the start pulse Dya to the output of the start pulse Dyb corresponds to a first field, and the period from the output of the start pulse Dyb to the output of the next start pulse Dya corresponds to a second field.

The start pulses Dya and Dyb are output alternately, with the timing of output of the start pulse Dya fixed regardless of the specification value Q. Thus, when the start pulse Dya output in each frame (16.7 milliseconds) is identified, it is surely possible to identify the start pulse Dyb defining the beginning of the second field. Thus, in FIG. 1 and FIGS. 4 to 6, the start pulses Dya and Dyb are denoted simply as Dy without distinction therebetween.

According to the start pulses Dya and Dyb and the clock signal Cly described above, the scanning-line driving circuit 130 outputs scanning signals G1 to G480. More specifically, upon receiving the start pulse Dya, the scanning-line driving circuit 130 sequentially pulls the scanning signals G1 to G480 to the H level individually in periods when the clock signal Cly is at the L level, and upon receiving the start pulse Dyb, the scanning-line driving circuit 130 sequentially pulls the scanning signals G1 to G480 to the H level individually in periods when the clock signal Cly is at the H level.

Since the start pulse Dya is supplied at the beginning of the period of one frame (at the beginning of the first field), the selection triggered by the supply of the start pulse Dya does not change depending on the specification value Q. Furthermore, since the selection triggered by the supply of the start pulse Dya takes place in periods when the clock signal Cly is at the L level, during the first field and second field of a frame, the selection takes place at intervals each corresponding to half the period of the clock signal Cly, and starts with the scanning line 112 on the 1st row and proceeds downward in the screen in order of the scanning lines 112 on the 2nd, 3rd, 4th, . . . and 480th rows.

On the other hand, since the start pulse Dyb is supplied at the beginning of the second field, the selection triggered by the supply of the start pulse Dyb is shifted earlier or later as a whole according to the specification value Q. More specifically, since the selection triggered by the start pulse Dyb takes place in periods when the clock signal Cly is at the H level, during the second field of a frame and the first field of the next frame, the selection starts with the scanning line 112 on the 1st row and proceeds downward in the screen in order of the scanning lines 112 on the 2nd, 3rd, 4th, . . . and 480th rows, in intervals between the periods of the selection triggered by the start pulse Dya.

If, for example, the specification value Q is "−1", the selection of the 1st to 240th rows from the second field of a frame to the first field of the next frame takes place earlier than the timing T as a whole by one period of the clock signal Cly, as shown in FIG. 5, and if the specification value Q is "+1", the selection is delayed from the timing T as a whole by one period of the clock signal Cly, as shown in FIG. 6.

Figure 7:
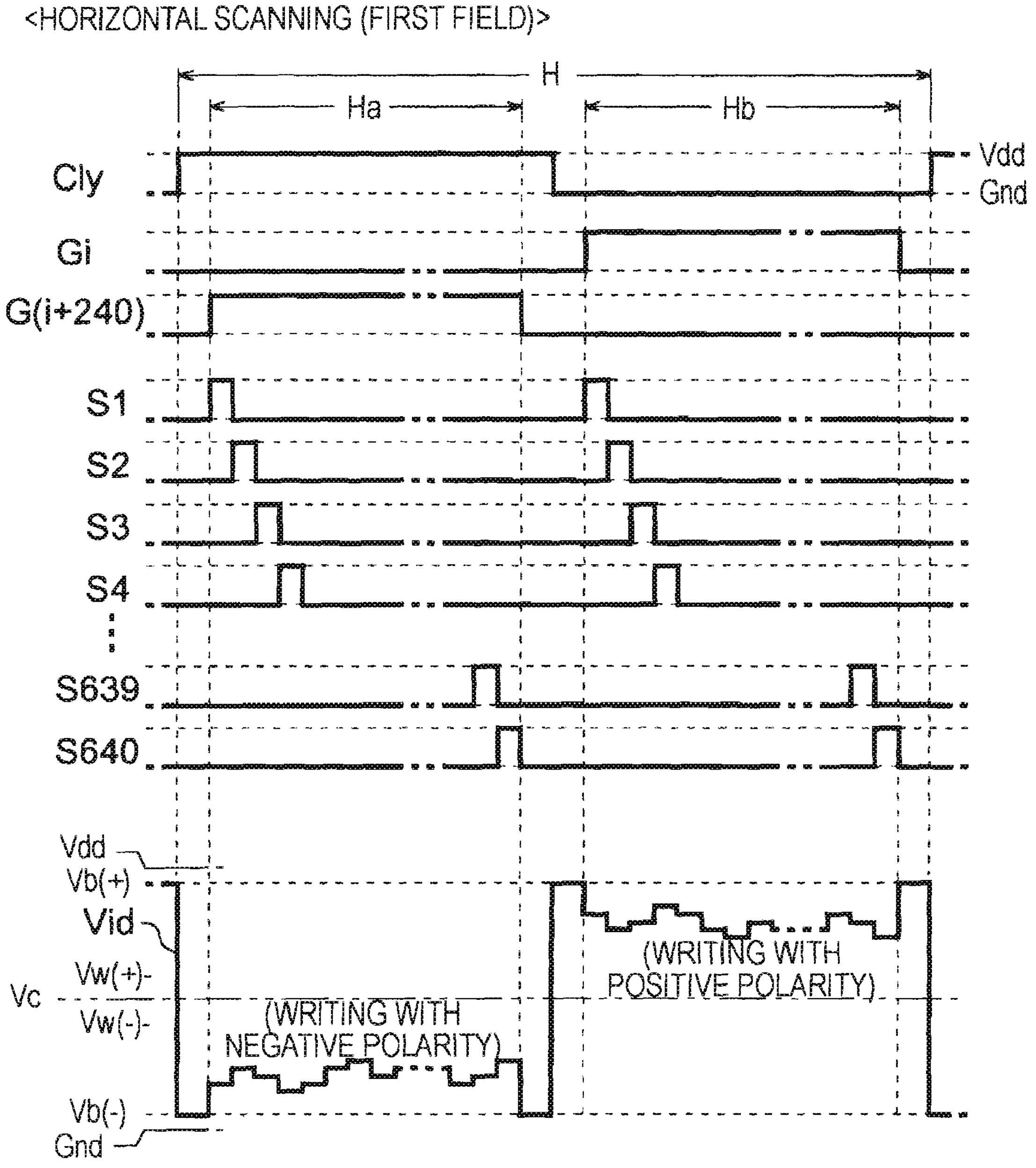
FIG. 7 is a diagram showing an example voltage waveform of data signals in the display panel.
Figure 8:
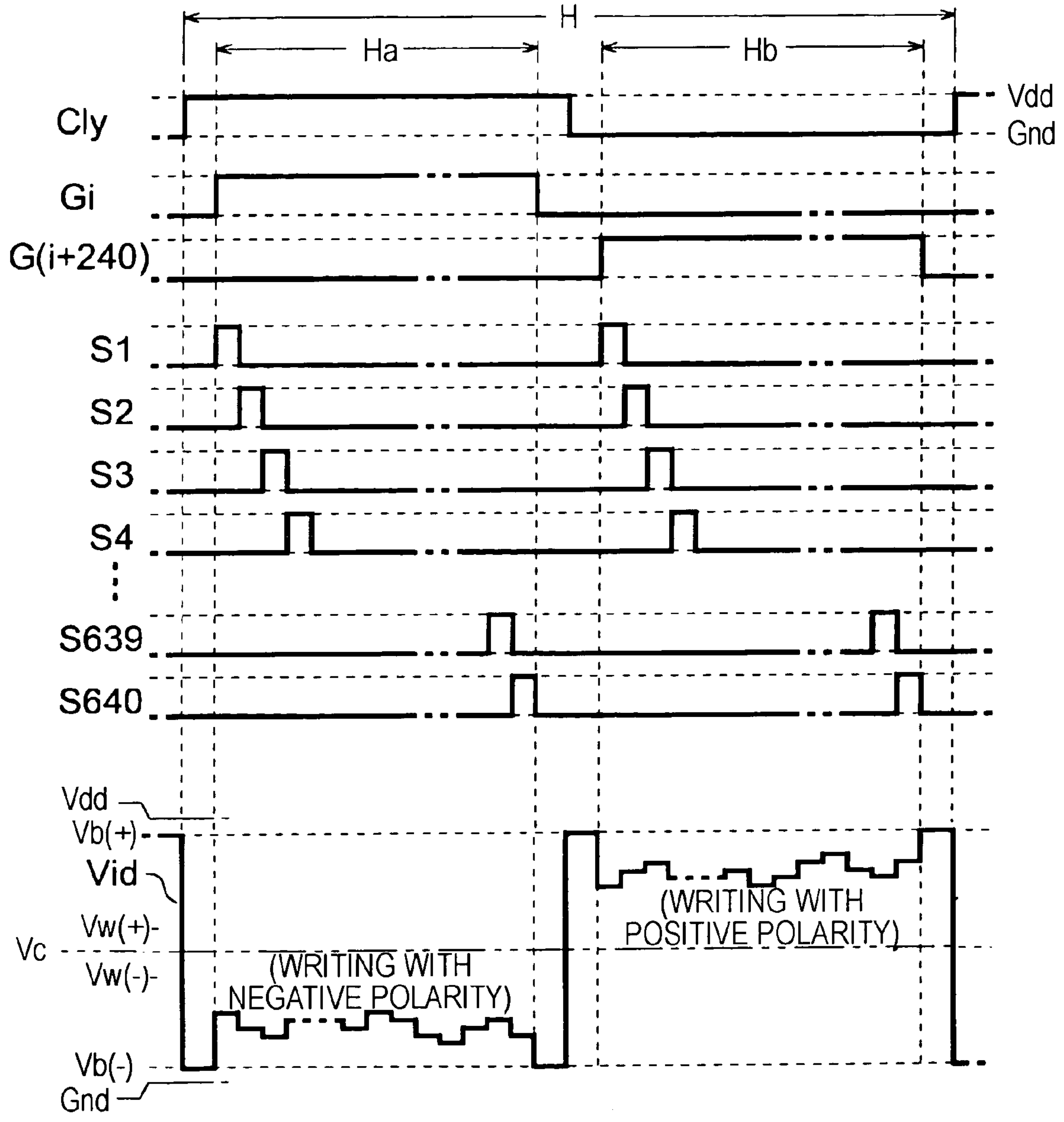
FIG. 8 is a diagram showing an example voltage waveform of data signals in the display panel.

The data-line driving circuit 140 includes a sampling-signal outputting circuit 142 and n-channel TFTs 146 provided individually in association with the data lines 114. The sampling-signal outputting circuit 142 outputs sampling signals S1, S2, S3, . . . and S640 individually to the associated data lines 114 according to a control signal Ctrl-x supplied from the control circuit 52, as shown in FIG. 7 or FIG. 8. The sampling signals S1, S2, S3, . . . and S640 sequentially go to the H level individually in periods when the associated scanning line 112 is selected so that the scanning signal supplied to the scanning line goes to the H level. The control signal Ctrl-x actually refers to a start pulse or a clock signal. However, since the control signal Ctrl-x is not directly relevant to this embodiment, detailed description of the control signal Ctrl-x is omitted.

The period during which the scanning signal is at the H level is actually somewhat shorter than half the period of the clock signal Cly, as shown in FIG. 7 or FIG. 8. Furthermore, if the specification value Q is "0", in the first field, the scanning signal Gi goes to the H level after the scanning signal G(i+240) goes to the H level, as shown in FIG. 7, and in the second field, the scanning signal G(i+240) goes to the H level after the scanning signal Gi goes to the H level, as shown in FIG. 8.

The display-data processing circuit 56 shows in FIG. 1 converts display data Video for one row of pixels on the selected scanning line 112 into data signals Vid having polarities described below, according to the output of the sampling signals S1 to S640 supplied from the sampling-signal outputting circuit 142.

The display-data processing circuit 56 converts display data Video into data signals Vid having a positive polarity in the case of display data Video of pixels on a line that is selected when the clock signal Cly is at the L level, and converts display data Video into data signals Vid having a negative polarity in the case of display data Video of pixels on a line that is selected when the clock signal Cly is at the H level. That is, the display-data processing circuit 56 converts display data Video into data signals Vid having a positive polarity in the case of display data Video of pixels on a row that is selected by the selection triggered by the supply of the start pulse Dya, and converts display data Video into data signals Vid having a negative polarity in the case of display data Video of pixels on a row selected by the selection triggered by the supply of the start pulse Dyb.

The positive polarity herein refers to a voltage higher than a reference voltage Vc (refer to FIG. 7 or FIG. 8) that is chosen to be higher than the voltage LCcom applied to the counter electrode 108, and the negative polarity refers to a voltage lower than the reference voltage Vc. In this embodiment, the polarities of data signals Vid are defined with reference to the voltage Vc. Unless otherwise explicitly described, voltages are defined with reference to a zero voltage at a ground potential Gnd corresponding to a logic L level.

The voltage LCcom applied to the counter electrode 108 is chosen to be lower than the reference voltage Vc. This is because, as described in the section of the related art, a pushdown occurs, i.e., the potential at the drain (the pixel electrode 118) decreases due to the stray capacitance between the gate and drain of the TFT 116 when the TFT 116 is turned from ON to OFF. If the voltage LCcom is chosen to be the same as the reference voltage Vc, the effective value of voltage of the liquid crystal capacitor 120 by negative-polarity writing becomes somewhat larger than that by positive-polarity writing due to the pushdown (assuming that the TFT 116 is an n-channel TFT). Thus, the voltage LCcom is chosen with an offset to be lower than the reference voltage Vc so that the effect of the pushdown will be canceled.

With the voltage LCcom chosen appropriately as described above, application of a DC component to the liquid crystal capacitor 120 is prevented. However, the flexibility regarding prevention of application of a DC component to the liquid crystal capacitor 120 will be improved if it is possible to adjust in other ways the effective value of voltage written to the liquid crystal capacitor 120 with the positive polarity and the effective value of voltage written to the liquid crystal capacitor 120 with the negative polarity.

Thus, the following description will first be directed to an operation in the case where the specification value Q is "0" and then to an operation in the case where the specification value Q is set to a value other than "0" by the operating element 70.

First, the control circuit 52 stores display data Video supplied from an external upper-level device in an internal memory of the display-data processing circuit 56. Then, when the scanning line 112 on a row is selected in the display panel 10, the control circuit 52 reads display data for the row at a rate that is double the rate of storage, and converts the display data into analog data signals Vid. Furthermore, in synchronization with the reading of the display data, the control circuit 52 controls the sampling-signal outputting circuit 142 using the control signal Ctrl-x so that the sampling signals S1 to S640 sequentially go to the H level.

If the specification value is "0", in the first field, the scanning lines 119 are selected in order of the 241st, 1st, 242nd, 2nd, 243rd, 3rd, . . . 480th, and 240th rows. For this purpose; the control circuit 52 controls the scanning-line driving circuit 130 so that the scanning line 112 on the 241st row is selected first, and controls the display-data processing circuit 56 so that display data Video for the 241st row, stored in the memory, is read at the double rate and converted into data signals Vid having a negative polarity. Furthermore, the control circuit 52 controls the sampling-signal outputting circuit 142 so that the sampling signals S1 to S640 sequentially go to H level in a mutually exclusive manner in synchronization with the reading. In response to the sampling signals S1 to S640 sequentially going to the H level, the associated TFTs 146 are sequentially turned on so that data signals Vid supplied to an image signal line 171 are sampled by the 1st to 640th data lines 114.

Furthermore, when the scanning line 112 on the 241st row is selected, the scanning signal G241 goes to the H level, so that the TFTs 116 of all the pixels 110 on the 241st row are turned on. Thus, the negative-polarity voltages of the data signals Vid sampled by the data lines 114 are applied to the associated pixel electrodes 118. Accordingly, in the liquid crystal capacitors 120 of the pixels at the intersections of the 241st row and the 1st, 2nd, 3rd, 4th, . . . 639th, and 640th columns, negative-polarity voltages corresponding to pixel levels specified by the display data Video are written and stored.

Then, the control circuit 52 controls the scanning-line driving circuit 130 so that the scanning line 112 on the 1st row is selected, and controls the display-data processing circuit 56 so that display data Video for the 1st row, stored in the memory, is read at the double rate and converted into positive-polarity data signals Vid. Furthermore, the control circuit 52 controls the sampling-signal outputting circuit 142 so that the sampling signals S1 to S640 sequentially go to the H level in synchronization with the reading.

When the scanning line 112 on the 1st row is selected, the scanning signal G1 goes to the H level, so that the TFTs 116 of all the pixels 110 on the first row are turned on. Thus, the voltages of the data signals Vid sampled by the data lines 114 are written to the associated pixel electrodes 118. In the liquid crystal capacitors 120 of the pixels at the intersections of the 1st row and the 1st to 640th columns, positive-polarity voltages corresponding to pixel levels specified by the display data Video are written and stored.

Then, if the specification value Q is "0", in the first field, voltages are written similarly in order of the 242nd, 2nd, 243rd, 3rd, . . . 480th, and 240th rows. Thus, positive-polarity voltages corresponding to pixel levels are written to and stored at the pixels on the 1st to 240th rows, and negative-polarity voltages corresponding to pixel levels are written to and stored at the pixels on the 241st to 480th rows.

If the specification value Q is "0", in the second field, the scanning lines 112 are selected in order of the 1st, 241st, 2nd, 242nd, 3rd, 243rd, 4th, 244th, . . . 240th, and 480th rows, and the polarity of writing on each of the rows in the second field is inverted compared with that IN the first field. Thus, negative-polarity voltages corresponding to pixel levels are written to and stored at the pixels on the 1st to 240th rows, and positive-polarity voltages corresponding to pixel levels are written to and stored at the pixels on the 241st to 480th rows.

FIG. 7 is a diagram showing an example of the voltage waveform of the data signals Vid in the periods of selection of the (i+240)-th and i-th scanning lines in the first field.

In FIG. 7, voltages Vb(+) and Vb(−) respectively denote positive-polarity and negative-polarity voltages corresponding to a lowest pixel level, i.e., black, and are symmetric with reference to the reference voltage Vc. Assuming that a decimal pixel level value of "0" specified by the display data Video represents the lowest pixel level corresponding to black and the pixel level becomes higher as the decimal value increases, since the normally white mode is employed in this embodiment, when display data Video is converted into data signals Vid having a positive polarity, the voltages of the data signals Vid become lower than the voltage Vb(+) as the pixel level values increase. On the other hand, when display data Video is converted into data signals Vid having a negative polarity, the voltages of data signals Vid become higher than the voltage Vb(−) as the pixel level values increases.

In the first field, the scanning line 112 on the (i+240)-th row is selected earlier than the scanning line 112 on the i-th row. Thus, in the period when the scanning signal G(i+240) is at the H level, for example, during the period when the sampling signal S1 is at the H level, the data signal Vid has a negative-polarity voltage corresponding to the pixel level of the pixel at the intersection of the (i+240)-th row and the 1st column, and the data signal Vid changes to negative-polarity voltages corresponding to the pixel levels of the pixels on the 2nd, 3rd, 4th, . . . and 640th columns in accordance with the change of the sampling signals.

On the i-th row selected next, data signals Vid are written with the positive polarity. Thus, in the period when the scanning signal Gi is at the H level, for example, during the period when the sampling signal S1 is at the H level, the data signal Vid has a positive-polarity voltage corresponding to the pixel level of the pixel at the intersection of the i-th row and the 1st column. Then, the data signal Vid changes to positive-polarity voltages corresponding to the pixel levels of the pixels on the 2nd, 3rd, 4th, . . . and 640th column.

In the second field, the scanning line 112 on the (i+240)-th row is selected later than the scanning line 112 on the I-th row. Thus, the polarity of writing is inverted when the scanning signal G(i+240) goes to the H level, so that the voltages of the data signals Vid have a waveform shown in FIG. 8.

In FIGS. 7 and 8, for the purpose of convenience, the vertical scale representing the voltages of the data signal Vid is shown as expanded relative to the vertical scales of other signals. The data signal Vid has a voltage corresponding to black during the period from the falling of the sampling signal S640 to the L level to the rising of the sampling signal S1 to the H level, so that even when a voltage is written to a pixel by mistake due to a timing shift or the like, the voltage will not contribute to display.

Figure 9:
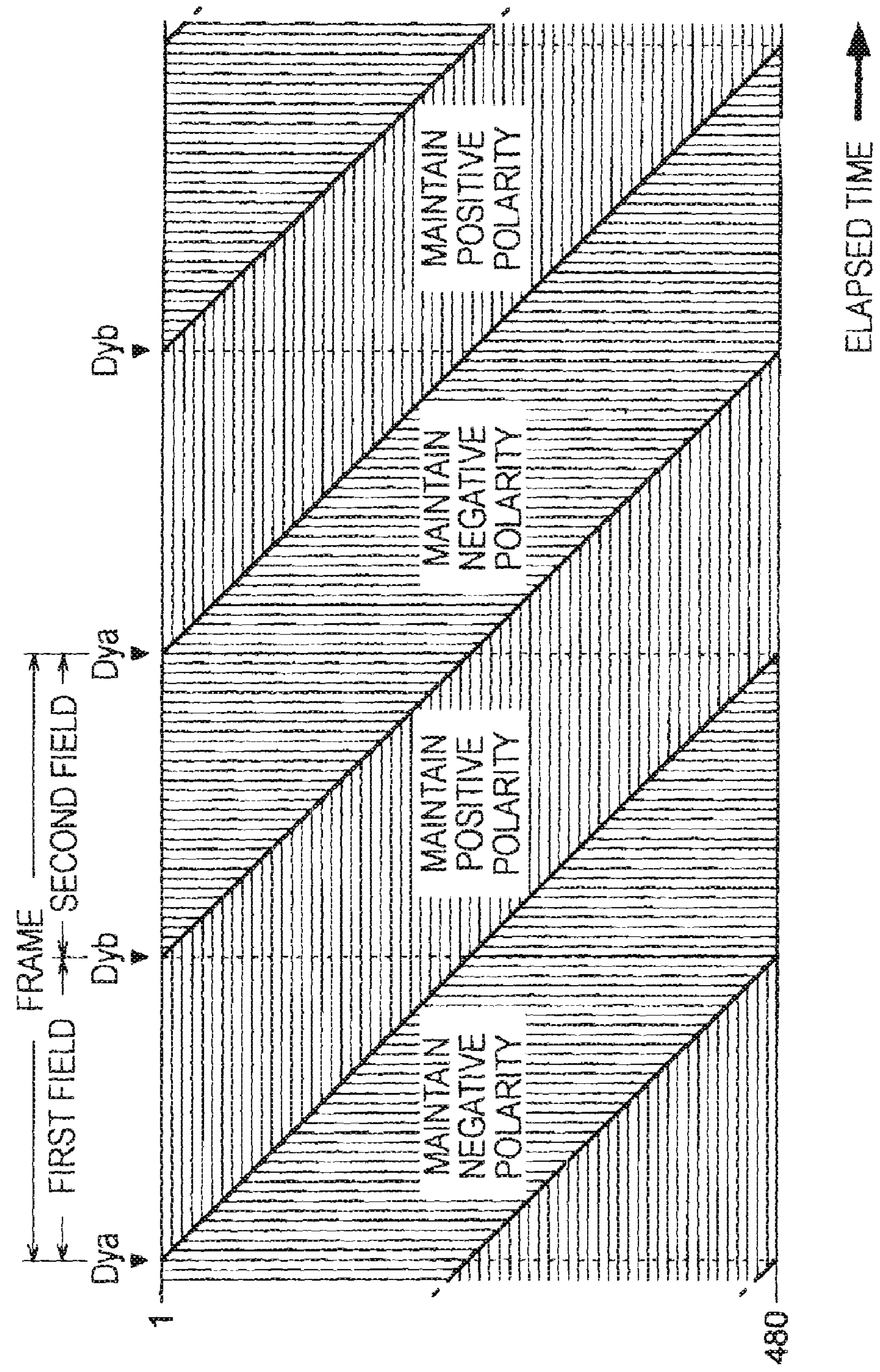
FIG. 9 is a diagram showing transition of pixel states in a display area.

FIG. 9 is a diagram showing the status of writing on each line over successive frames in relation to elapse of time in a case where the specification value Q is "0". As shown in FIG. 9, in this embodiment, in the first field, negative-polarity voltages are written to and stored until next writing at the pixels on the 241st, 242nd, 243rd, . . . and 480th rows, and positive-polarity voltages are written to and stored until next writing at the pixels on the 1st, 2nd, 3rd, . . . and 240th rows. On the other hand, in the second field, negative-polarity voltages are written to and stored until next writing at the pixels on the 1st, 2nd, 3rd, . . . and 240th rows, and positive-polarity voltages are written to and stored until next writing at the pixels on the 241st, 242nd, 243rd, . . . and 480th pixels.

If the specification value Q is "0", since the period of each of the first and second fields corresponds to 240 periods of the clock signal Cly, at each of the pixels, a positive-polarity voltage is maintained substantially for one half of the time and a negative-polarity voltage is maintained for the other half of the time in the liquid crystal capacitor 120.

Next, for example, if the specification value is "−1", the start pulse Dyb is output at a timing earlier than the timing T by one period of the clock signal Cly.

Thus, if the specification value Q is "−1", the first field corresponds to 239 periods of the clock signal Cly, and the second field corresponds to 241 periods of the clock signal Cly. Furthermore, if the specification value Q is "−1", as shown in FIG. 5, in the first field, the scanning lines 112 are selected in order of the 242nd, 1st, 243rd, 2nd, 244th, 3rd, . . . 480th, and 239th rows, and in the second field, the scanning lines 112 are selected in order of the 1st, 240th, 2nd, 241st, 3rd, 242nd, . . . 241st, and 480th rows.

Figure 10:
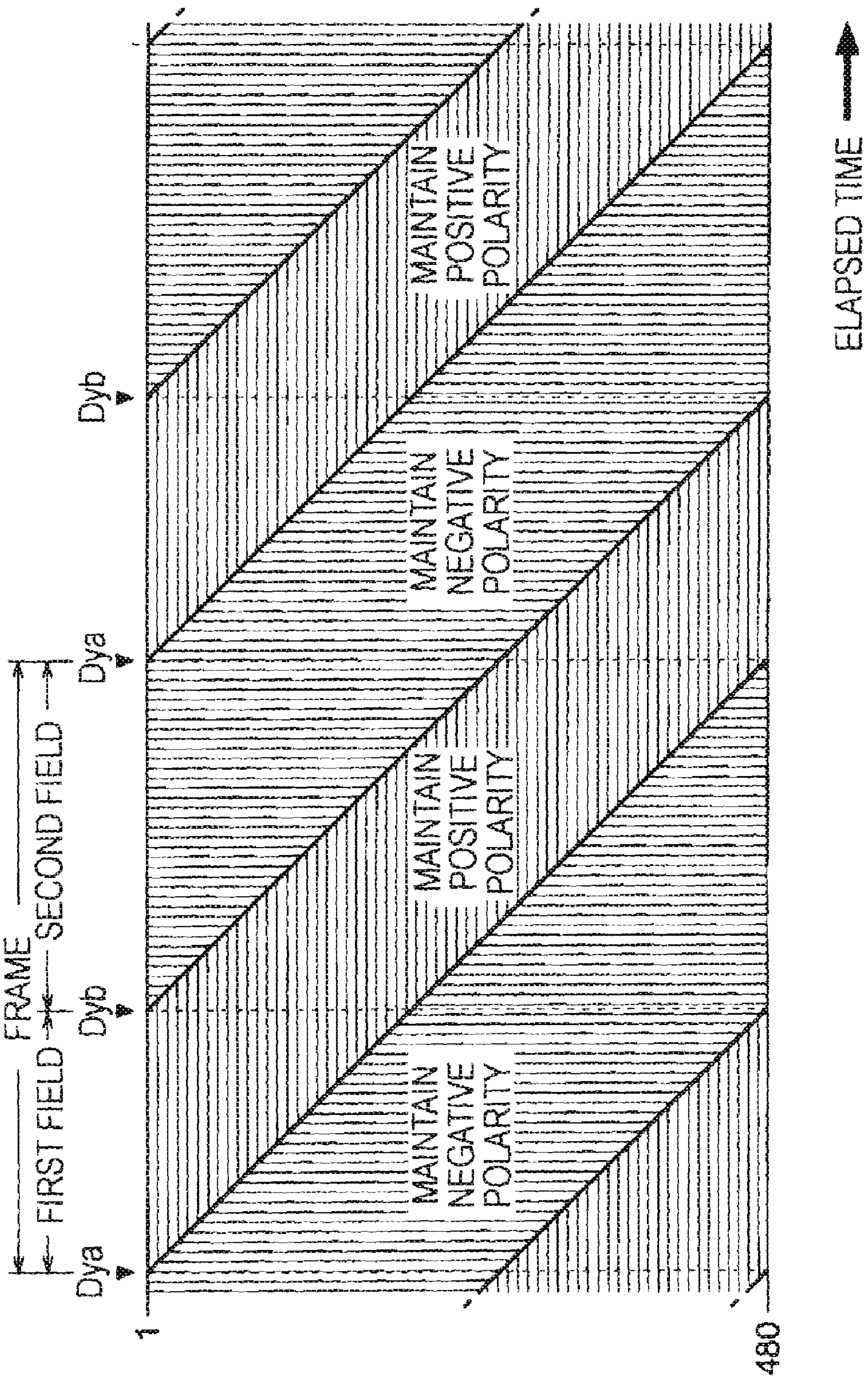
FIG. 10 is a diagram showing transition of pixel states in the display area.

The above description deals with a case where the specification value Q is "−1". Similarly, when the specification value Q is negative, the timing of output of the start pulse Dyb becomes earlier as the absolute value of the specification value Q increases. Thus, as shown in FIG. 10, the period of maintaining a negative-polarity voltage written by the selection triggered by the supply of the start pulse Dyb is longer than the period of maintaining a positive-polarity voltage written by the selection triggered by the supply of the start pulse Dya. Thus, the positive-polarity voltage and the negative-polarity voltage applied to the liquid crystal capacitor 120 become unequal. That is, the effective value of the negative-polarity voltage becomes greater than the effective value of the positive-polarity voltage.

On the other hand, for example, if the specification value is "+1", the start pulse Dyb is output at a timing later than the timing T by one period of the clock signal Cly.

Thus, if the specification value Q is "+1", the first field corresponds to 241 periods of the clock signal Cly, and the second field corresponds to 239 periods of the clock signal Cly. Furthermore, if the specification value Q is "+1", as shown In FIG. 6, in the first field, the scanning lines 112 are selected in order of the 240th, 1st, 241st, 2nd, 242nd, 3rd, . . . 480th, and 241st rows, and in the second field, the scanning lines 112 are selected in order of the 1st, 242nd, 2nd, 243rd, 3rd/244th, . . . , 239th, and 480th rows.

Figure 11:
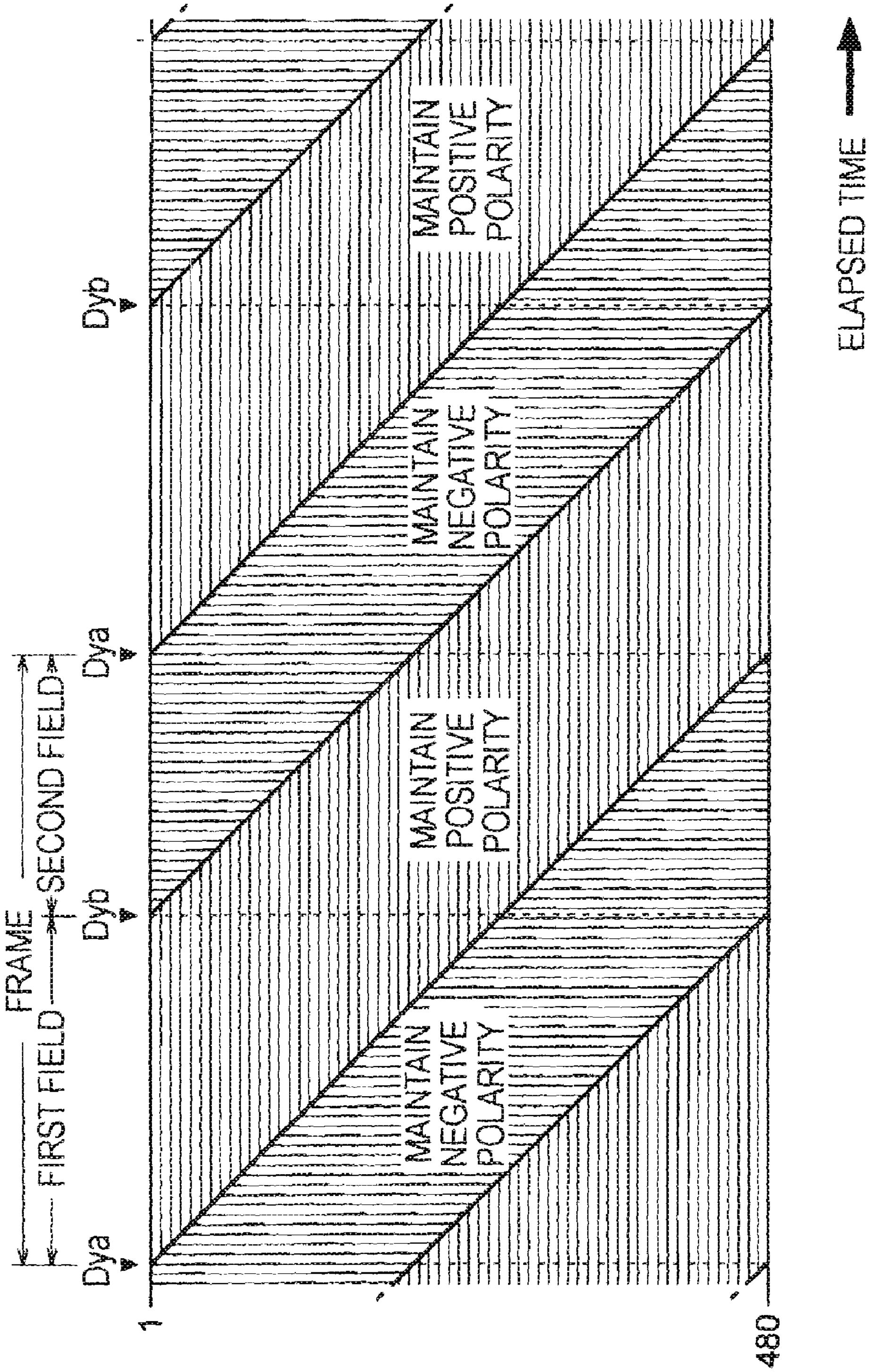
FIG. 11 is a diagram showing transition of pixel states in the display area.

The above description deals with a case where the specification value Q is "+1". Similarly, when the specification value Q is a positive value, the timing of output of the start pulse Dyb becomes later as the absolute value of the specification value Q increases. Thus, as shown in FIG. 11, the period of maintaining a negative-polarity voltage written by the selection triggered by the supply of the start pulse Dyb becomes shorter than the period of maintaining a positive-polarity voltage written by the selection triggered by the supply of the start pulse Dya. Thus, the effective value of the negative-polarity voltage applied to the liquid crystal capacitor 120 is less than the effective value of the positive-polarity voltage applied to the liquid crystal capacitor 120.

Thus, in this embodiment, the specification value Q is changed in the positive or negative direction so that the voltage maintained by the liquid crystal capacitor 120 can be adjusted in the positive direction or the negative direction. Accordingly, in the electro-optical device 1 according to this embodiment, even if the voltage applied to the counter electrode 108 is not appropriate, it is possible to adjust a voltage applied to the liquid crystal capacitor 120 by changing the specification value Q in the positive or negative direction so that a DC voltage will not be applied to the liquid crystal capacitor 120.

In the embodiment described above, a dot-sequential scheme is employed. That is, voltages corresponding to pixel levels of the pixels associated with the scanning line 112 on one row are written to the pixels on the 1st to 640th columns by sequentially sampling data signals Vid of the 1st to 640th columns. Alternatively, phase expansion (also called serial-to-parallel conversion) may be used in combination. That is, data signals may be temporally expanded by n (where n is an integer greater than or equal to 2) and supplied to n image signal lines. This scheme is described, for example, in JP-A-2000-112437. Yet alternatively, a line-sequential scheme may be employed. That is, data signals may be supplied simultaneously to all the data lines 114.

Furthermore, although the normally white mode is employed in this embodiment, i.e., a white color is displayed when no voltage is applied, alternatively, the normally black mode may be employed so that a black color is displayed when no voltage is applied.

Figure 12:
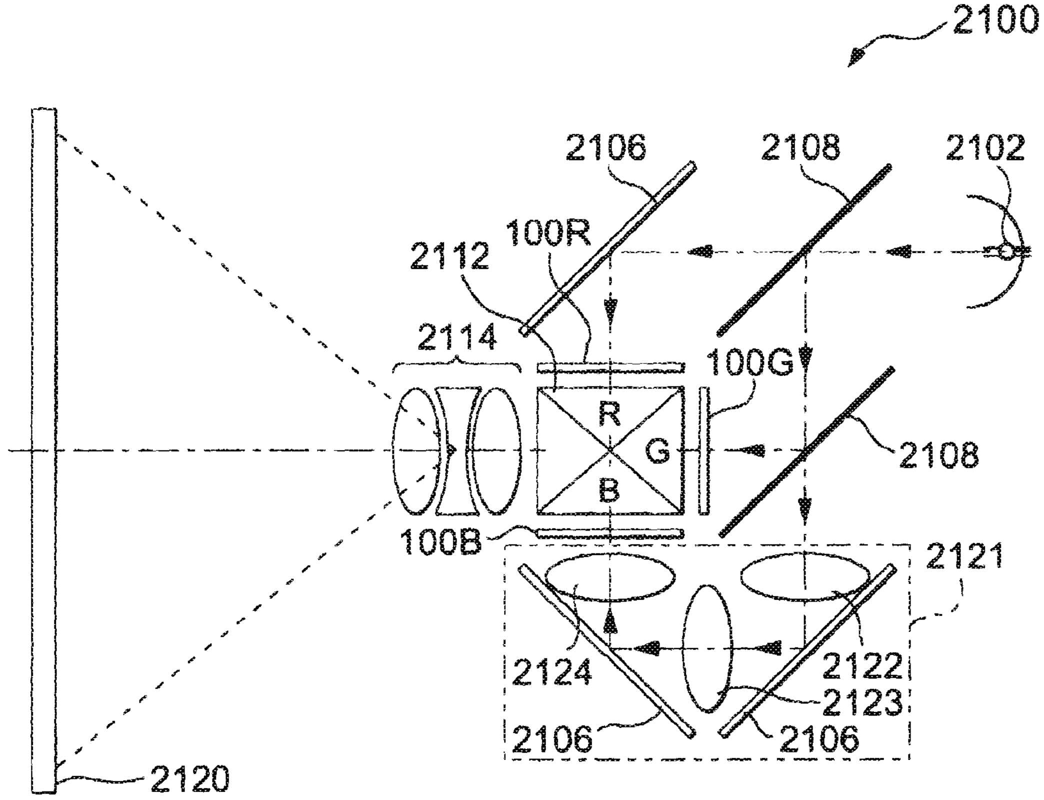
FIG. 12 is a diagram showing the configuration of a projector including an electro-optical device according to an embodiment of the invention.

Next, an example of an electronic apparatus including the electro-optical device 1 according to the embodiment described above will be described. FIG. 12 is a plan view showing the configuration of a panel projector including light valves each configured similarly to the display panel 10 of the electro-optical device 1 described above.

Referring to FIG. 12, in a projector 2100, light that is to enter the light valves are separated into components of the three primary colors of red (R), green (G), and blue (B) by three mirrors 2106 and two dichroic mirrors 2108 provided inside the projector 2100, and the RGB components are directed to light valves 100R, 100G, and 100B individually corresponding to the primary colors. The light of the B component has a longer optical path compared with the light of the R component or the G component. Thus, in order to reduce loss of the light of the B component, the light of the B component is directed to the light valve 100B via a relay lens system 2121 including an input lens 2122, a relay lens 2123, and an output lens 2124.

The configuration of each of the light valves 100R, 100G, and 100B is the same as the configuration of the display panel 10 in the embodiment described above, and the light valves 100R, 100G, and 110B are driven according to image data corresponding to the R, G, and B components, respectively, supplied from an external upper-level device (not shown).

The components that have been modulated individually by the light valves 100R, 100G, and 100B enter a dichroic prism 2112 from three directions. In the dichroic mirror 2112, the light of the R component and the light of the B component are refracted by 90 degrees, while the light of the G component goes straight. Thus, images of the individual colors are combined, and the combined image is enlarged without inversion and projected by a lens unit 2114, whereby a color image is displayed on a screen 212*u*.

The images that are formed through the light valves 100R and 100B are projected after being reflected by the dichroic prism 2112, while the image that is formed through the light valve 100G is projected directly. Thus, the direction of horizontal scanning by the light valves 100R and 100B is chosen to be opposite to the direction of horizontal scanning by the light valve 100G, so that images that are flipped left for right are displayed.

As well as the projector 2100 described with reference to FIG. 12, examples of electronic apparatuses include direct-viewing monitors, such as monitors of cellular phones, personal computers, television sets, or video cameras, car navigation apparatuses, pagers, electronic organizers, electronic calculators, word processors, work stations, video phones, point-of-sales (POS) terminals, digital still cameras, or apparatuses provided with touch panels. Obviously, electro-optical devices according to the invention can be used in these various electronic apparatuses.

The entire disclosure of Japanese Patent Application No. 2007-028062, filed Feb. 7, 2007 is expressly incorporated by reference herein.

What is claimed is:

1. A method of driving an electro-optical device including a plurality of pixels provided in association with intersections of a plurality of scanning lines and a plurality of data lines, the method comprising:

selecting the plurality of scanning lines in a predetermined order in each of first and second fields of one frame based on a clock signal, a first start pulse and a second start pulse such that the plurality of scanning lines selected during the first field is not equal to the plurality of scanning lines selected during the second field;

when one of the plurality of scanning lines is selected in the first field, for each pixel located on the selected scanning line, supplying one of a positive voltage and a negative voltage as the data signal to one of the plurality of data lines associated with the pixel, the positive voltage having a positive polarity corresponding to a voltage higher than a predetermined reference potential and the negative voltage having a negative polarity corresponding to a voltage lower than the predetermined reference potential;

when the one of the plurality of scanning lines is selected in the second field, for each pixel located on the selected scanning line, supplying the other of the positive voltage and the negative voltage as the data signal to one of the plurality of data lines associated with the pixel, a ratio between duration of the first field and the second field of the one frame being adjustable by changing a timing between the first start pulse and the second start pulse; and outputting a specification value, the specification value: i) being selected by a user, and ii) adjusting a duration of the second field to be greater than or less than a duration of the first field.

2. The method according to claim 1, during the first and second fields of one frame, selecting each of the plurality of scanning lines sequentially in a predetermined direction at predetermined intervals, starting from a predetermined one of the plurality of scanning lines, the data signal supplied to the associated data line having either one of the positive polarity or the negative polarity, and during the second field of the one frame and the first field of a next frame, again selecting each of the plurality of scanning lines sequentially in the predetermined direction at the predetermined intervals, starting from the predetermined one of the plurality of scanning lines, the data signal supplied to the associated data line having the other one of the positive polarity or the negative polarity.

3. A method of driving an electro-optical device including a plurality of pixels provided in association with intersections of a plurality of scanning lines and a plurality of data lines, the method comprising:

selecting the plurality of scanning lines in a predetermined order in each of first and second fields of one frame based on a clock signal, a first start pulse and a second start pulse such that the plurality of scanning lines selected during the first field is not equal to the plurality of scanning lines selected during the second field;

when one of the plurality of scanning lines is selected in the first field, for each pixel located on the selected scanning line, supplying one of a positive voltage and a negative voltage as the data signal to one of the plurality of data lines associated with the pixel, the positive voltage having a positive polarity corresponding to a voltage higher than a predetermined reference potential and the negative voltage having a negative polarity corresponding to a voltage lower than the predetermined reference potential;

when the one of the plurality of scanning lines is selected in the second field, for each pixel located on the selected scanning line, supplying the other of the positive voltage and the negative voltage as the data signal to one of the plurality of data lines associated with the pixel, the durations of the first field and the second field of the one frame being made different by changing a timing between the first start pulse and the second start pulse; and outputting a specification value, the specification value: i) being selected by a user, and ii) adjusting a duration of the second field to be greater than or less than a duration of the first field.

4. An electro-optical device comprising:

a plurality of scanning lines;

a plurality of data lines;

a plurality of pixels provided in association with intersections of the plurality of scanning lines and the plurality of data lines;

a scanning-line driving circuit that selects the plurality of scanning lines in a predetermined order in each of first and second fields of one frame based on a clock signal, a first start pulse and a second start pulse such that the plurality of scanning lines selected during the first field is not equal to the plurality of scanning lines selected during the second field;

a data-line driving circuit that supplies, as the data signal for each pixel located on a selected scanning line, a voltage corresponding to a pixel level of the pixel to one of the plurality of data lines associated with the pixel, the voltage supplied having one of a positive polarity and a negative polarity when one of the plurality of scanning lines is selected in the first field while having the other one of the positive polarity and the negative polarity when one of the plurality of scanning lines is selected in the second field, the positive polarity corresponding to a voltage higher than a predetermined reference potential and the negative polarity corresponding to a voltage lower than the predetermined reference potential;

a control circuit that sets a variable ratio between durations of the first field and the second field of the one frame by changing a timing between the first start pulse and the second start pulse; and a control unit capable of outputting a specification value, the specification value: i) being selected by a user, and ii) adjusting a duration of the second field to be greater than and less than a duration of the first field.

5. An electronic apparatus comprising the electro-optical device according to claim 4.

6. The method of driving the electro-optical device according to claim 1, when the duration of the first field is greater than the duration of the second field, the plurality of scanning lines selected during the first field being greater than the plurality of scanning lines selected during the second field, and when the duration of the second field is greater than the duration of the first field, the plurality of scanning lines selected during the second field being greater than the plurality of scanning lines selected during the first field.

7. The method of driving an electro-optical device according to claim 1, further comprising:

decreasing a duration of the first field by decreasing time between the first start pulse and the second start pulse; and increasing a duration of the first field by increasing time between the first start pulse and the second start pulse.

8. The method according to claim 1, further comprising:

when the specification value is a negative number, outputting, with the control circuit, the second start pulse at a time that is earlier than when the specification value is a positive number.

9. The method according to claim 3, further comprising:

when the specification value is a negative number, outputting, with the control circuit, the second start pulse at a time that is earlier than when the specification value is a positive number.

10. The method according to claim 4, further comprising:

when the specification value is a negative number, outputting, with the control circuit, the second start pulse at a time that is earlier than when the specification value is a positive number.

11. The method according to claim 1, when the specification value is a negative number, a period of maintaining the negative polarity voltage being longer than a period of maintaining the positive polarity voltage, and when the specification value is a positive number, a period of maintaining the negative polarity voltage being shorter than a period of maintaining the positive polarity voltage.

12. The method according to claim 3, when the specification value is a negative number, a period of maintaining the negative polarity voltage being longer than a period of maintaining the positive polarity voltage, and when the specification value is a positive number, a period of maintaining the negative polarity voltage being shorter than a period of maintaining the positive polarity voltage.

13. The method according to claim 4, when the specification value is a negative number, a period of maintaining the negative polarity voltage being longer than a period of maintaining the positive polarity voltage, and when the specification value is a positive number, a period of maintaining the negative polarity voltage being shorter than a period of maintaining the positive polarity voltage.

* * * * *